(12) United States Patent
Takano

(10) Patent No.: US 9,256,047 B2
(45) Date of Patent: Feb. 9, 2016

(54) LENS DRIVING APPARATUS

(71) Applicant: OLYMPUS CORPORATION, Shibuya-ku, Tokyo (JP)

(72) Inventor: Hisanori Takano, Musashino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/539,733

(22) Filed: Nov. 12, 2014

(65) Prior Publication Data

US 2015/0153537 A1 Jun. 4, 2015

(30) Foreign Application Priority Data

Nov. 29, 2013 (JP) .................................. 2013-248612

(51) Int. Cl.
*G02B 7/02* (2006.01)
*G02B 7/04* (2006.01)

(52) U.S. Cl.
CPC ........................................ *G02B 7/04* (2013.01)

(58) Field of Classification Search
USPC .................................. 359/694–701, 811–830
See application file for complete search history.

(56) References Cited

U.S. PATENT DOCUMENTS

| 5,206,762 | A | * | 4/1993 | Kasahara | ............ | G11B 7/0932 |
| | | | | | | 359/814 |
| 5,932,984 | A | * | 8/1999 | Murakami | ........... | G02B 27/646 |
| | | | | | | 318/268 |
| 7,161,751 | B2 | * | 1/2007 | Hasegawa | .............. | G02B 7/102 |
| | | | | | | 348/E5.028 |

FOREIGN PATENT DOCUMENTS

| JP | 2010266739 A | 11/2010 |
| JP | 2011085675 A | 4/2011 |

* cited by examiner

*Primary Examiner* — Mohammed Hasan
(74) *Attorney, Agent, or Firm* — Holtz, Holtz & Volek PC

(57) ABSTRACT

According to one embodiment, a lens driving apparatus comprises: a fixed member in which a first long groove is formed; a movable member including a lens and a second long groove; a first ball arranged between the first long groove and the second long groove, and configured to guide the movable member along the groove; a plurality of second balls arranged on a side opposite to a side of the first ball with the lens; a first actuator configured to generate a driving force for moving the movable member along the groove; and a second actuator for pivoting the movable member with respect to the fixed member. A pivoting center around which the movable member is pivoted with respect to the fixed member is a position of the first ball when the movable member is moved along the first long groove and the second long groove.

7 Claims, 16 Drawing Sheets

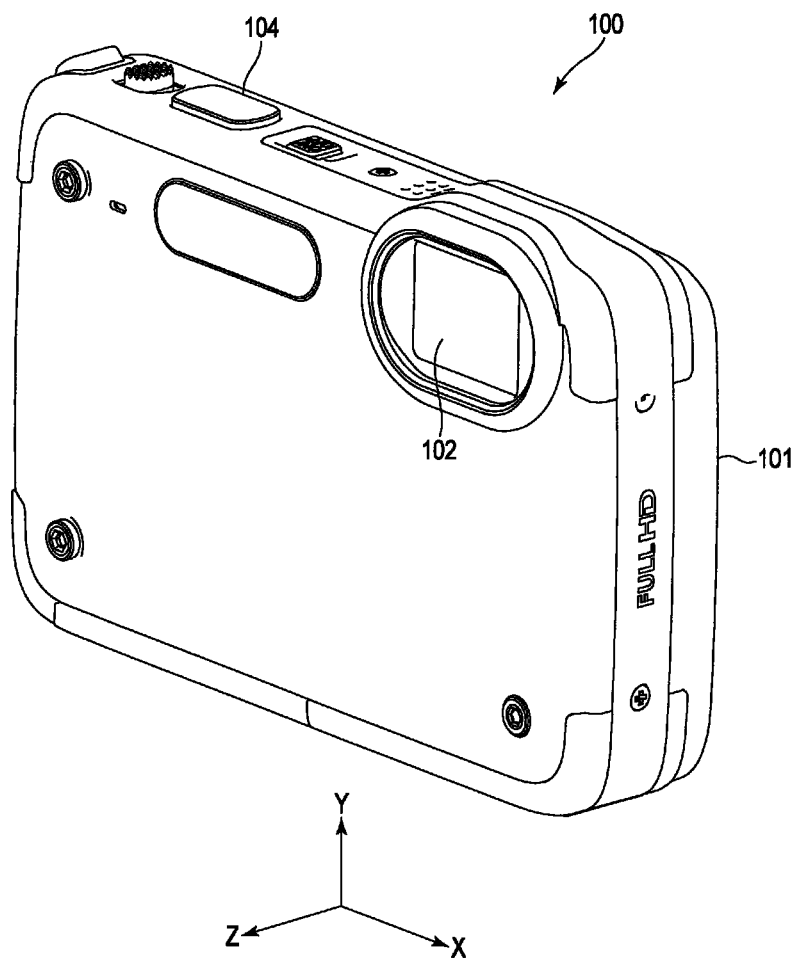
F I G. 1

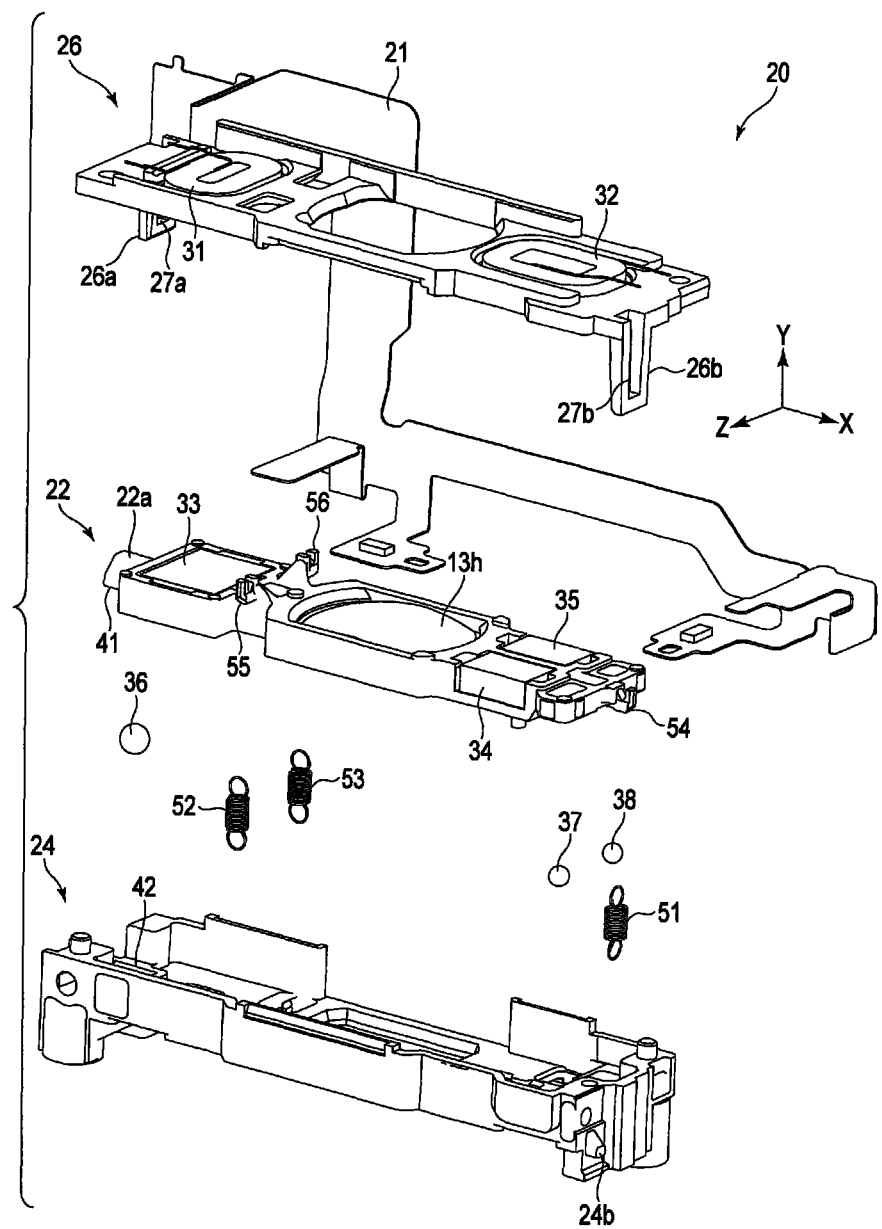
F I G. 6

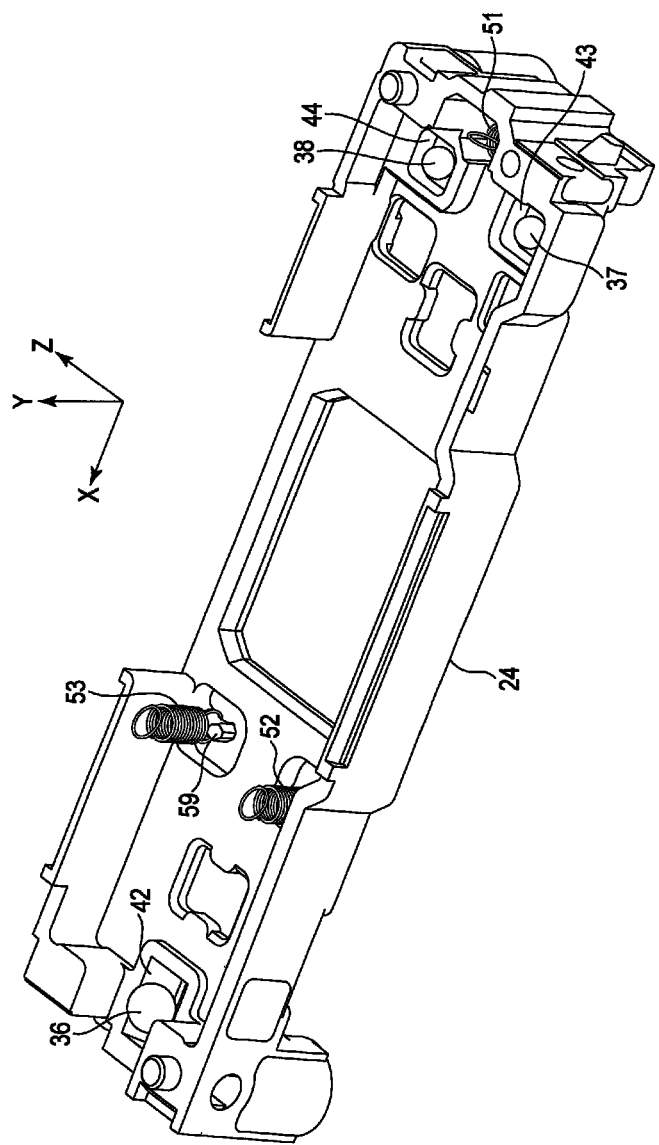
F I G. 12

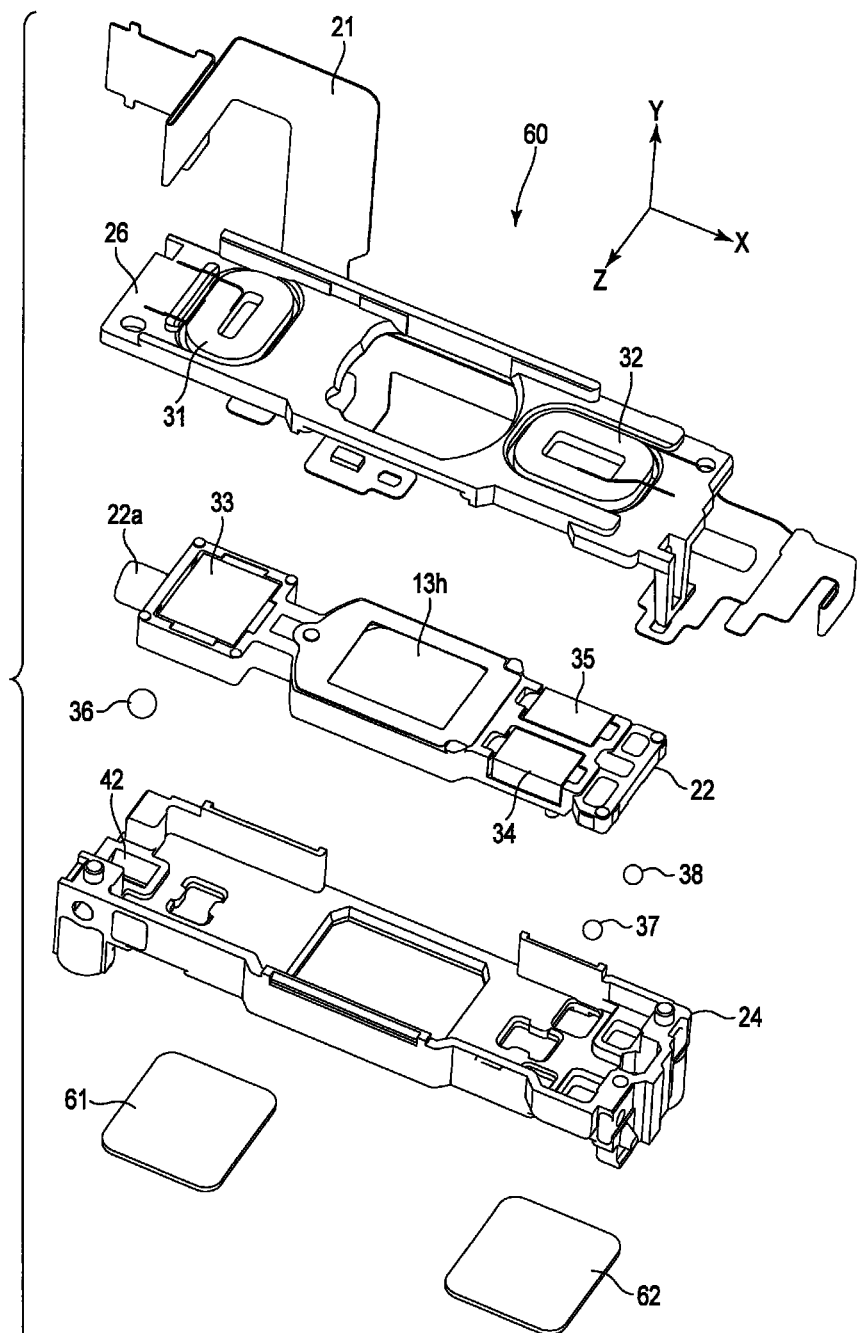
F I G. 17

LENS DRIVING APPARATUS

CROSS-REFERENCE TO RELATED APPLICATION

This application is based upon and claims the benefit of priority from Japanese Patent Applications No. 2013-248612, filed Nov. 29, 2013; the entire contents of which are incorporated herein by reference.

FIELD

Embodiments described herein relate generally to a lens driving apparatus for moving a movable member holding a lens with respect to a fixed member.

BACKGROUND

As shown in FIGS. 4 and 5 of Jpn. Pat. Appln. KOKAI Publication No. 2011-85675, a pivot guide groove 124 which engages with a pivoting shaft 115 is formed in one end portion (a positive-side end in the X direction) of a moving frame 119. The pivoting shaft 115 is attached to a fixed member 102. When the moving frame 119 is translated during yaw correction, the pivot guide groove 124 slides with respect to the pivoting shaft 115. Also, the pivot guide groove 124 permits the moving frame 119 to pivot around the pivoting shaft 115 in the pitch correction direction.

Consequently, a correction lens L7 held in the moving frame 119 can move in the pitch correction direction and yaw correction direction.

Jpn. Pat. Appln. KOKAI Publication No. 2010-266739 has disclosed an anti-vibration actuator capable of supporting a lens so that the lens can move without any vibration. This anti-vibration actuator includes a support arm 17 for connecting a fixed plate 12 and moving frame 14, and a steel ball 18 clamped between the moving frame 14 and fixed plate 12. A flexible portion 17a of the support arm 17 is readily elastically deformable. When a horizontal driving force acts on the moving frame 14, a horizontal translation is permitted. When a vertical driving force acts on the moving frame 14, the moving frame 14 pivots around the flexible portion 17a and its vicinity.

SUMMARY

A lens driving apparatus according to an aspect of the present invention comprises: a fixed member in which a first long groove is formed; a movable member including a second long groove formed in a position corresponding to a position where the first long groove is formed, and configured to move with respect to the fixed member in a plane perpendicular to an optical axis of a lens held by the movable member; a first ball arranged between the first long groove formed in the fixed member and the second long groove formed in the movable member, and configured to guide the movable member with respect to the fixed member along the first long groove and the second long groove; a plurality of second balls arranged on a side opposite to a side of the first ball with the lens formed in the movable member being sandwiched between the two sides, and configured to support movement of the movable member together with the first ball; a first actuator including a coil arranged in one of the fixed member and the movable member, and a magnet arranged in the other, and configured to generate a driving force for moving the movable member along the first long groove and the second long groove; and a second actuator including a coil arranged in one of the fixed member and the movable member, and a magnet arranged in the other, and configured to generate a driving force for pivoting the movable member with respect to the fixed member, wherein a pivoting center around which the movable member is pivoted with respect to the fixed member by the second actuator is a position of the first ball when the movable member is moved along the first long groove and the second long groove by the first actuator.

BRIEF DESCRIPTION OF THE DRAWINGS

FIG. 1 is a perspective appearance view showing an image capturing apparatus according to an embodiment;
FIG. 6 is an exploded perspective view of an anti-vibration unit according to the first embodiment;
FIG. 12 is a perspective view of the fixed member shown in FIG. 11;
FIG. 17 is an exploded perspective view of the anti-vibration unit shown in FIG. 16.

DETAILED DESCRIPTION

Figure 2:
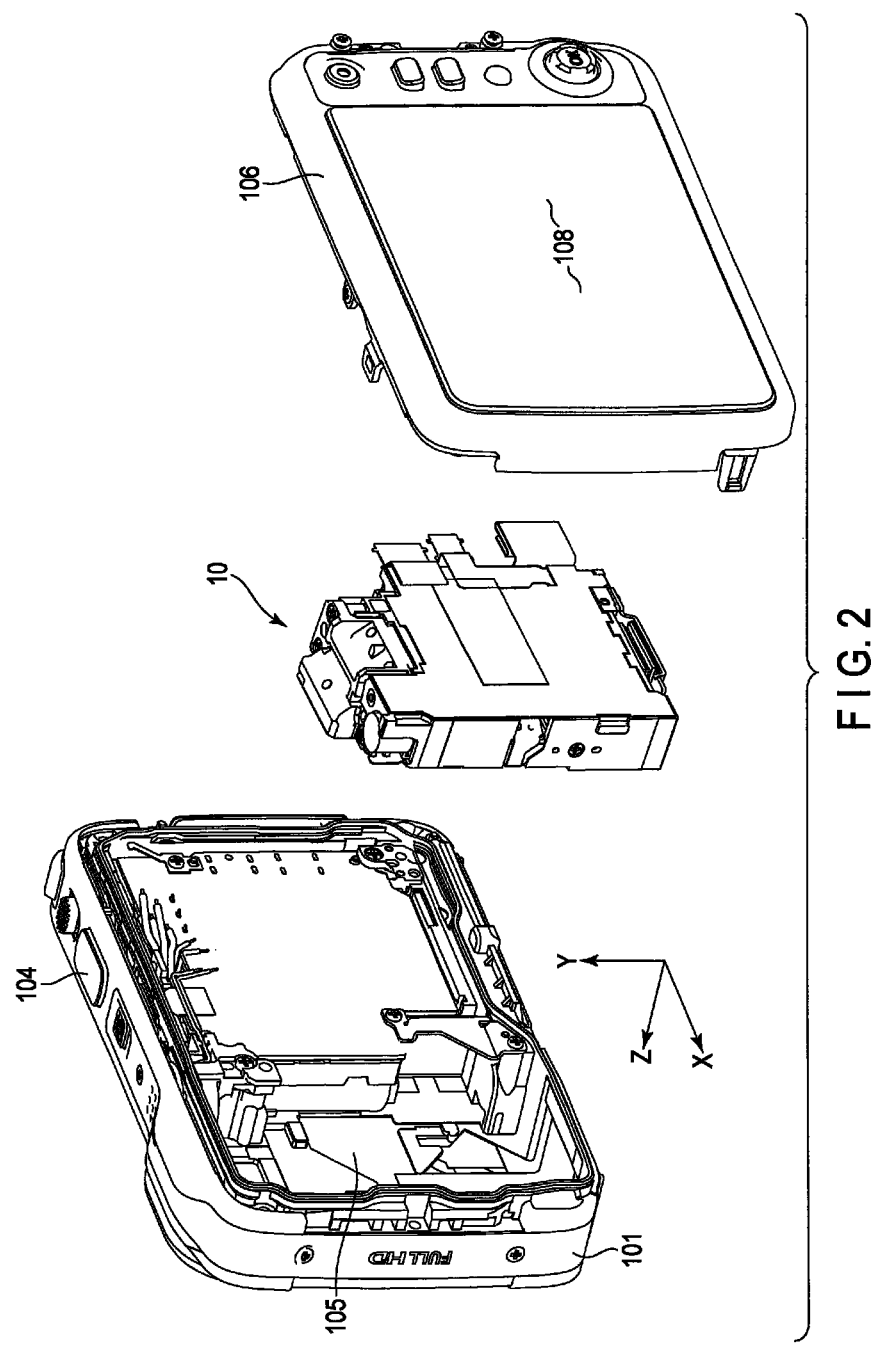
FIG. 2 is an exploded perspective view of the image capturing apparatus shown in FIG. 1.

Embodiments of the present invention will be explained below with reference to the accompanying drawings.

In the following explanation, a direction from a digital compact camera 100 (to be simply referred to as a camera 100 hereinafter) to an object will be called a front, and the opposite direction will be called a back. Also, in a state in which a user holds the camera 100 to aim it at an object (a state shown in FIG. 1), a direction parallel to an optical axis O from a lens 102 of the camera 100 to the object will be called a Z direction, a horizontal direction perpendicular to the Z direction will be called an X direction, and a vertical direction perpendicular to the Z and X directions will be called a Y direction.

The optical axis O of light entering the camera 100 through the lens 102 is bent downward at a right angle in the vertical direction (Y direction) by a reflecting mirror 14 (FIG. 5) of a lens frame 10 (to be described later). Therefore, the thickness of the camera 100 in the front-back direction can be decreased.

As shown in FIG. 1, the camera 100 includes a flat rectangular boxy housing 101. The lens 102 is attached to the front side of the housing 101. Also, a shutter button 104 is formed on the upper end of the housing 101.

As shown in FIG. 2, the camera 100 includes a rear cover 106 on the rear side of the housing 101. A display panel 108 for displaying a captured image is formed on the rear cover 106. In addition, a lens frame accommodating portion 105 for accommodating the lens frame 10 is formed inside the housing 101.

Figure 3:
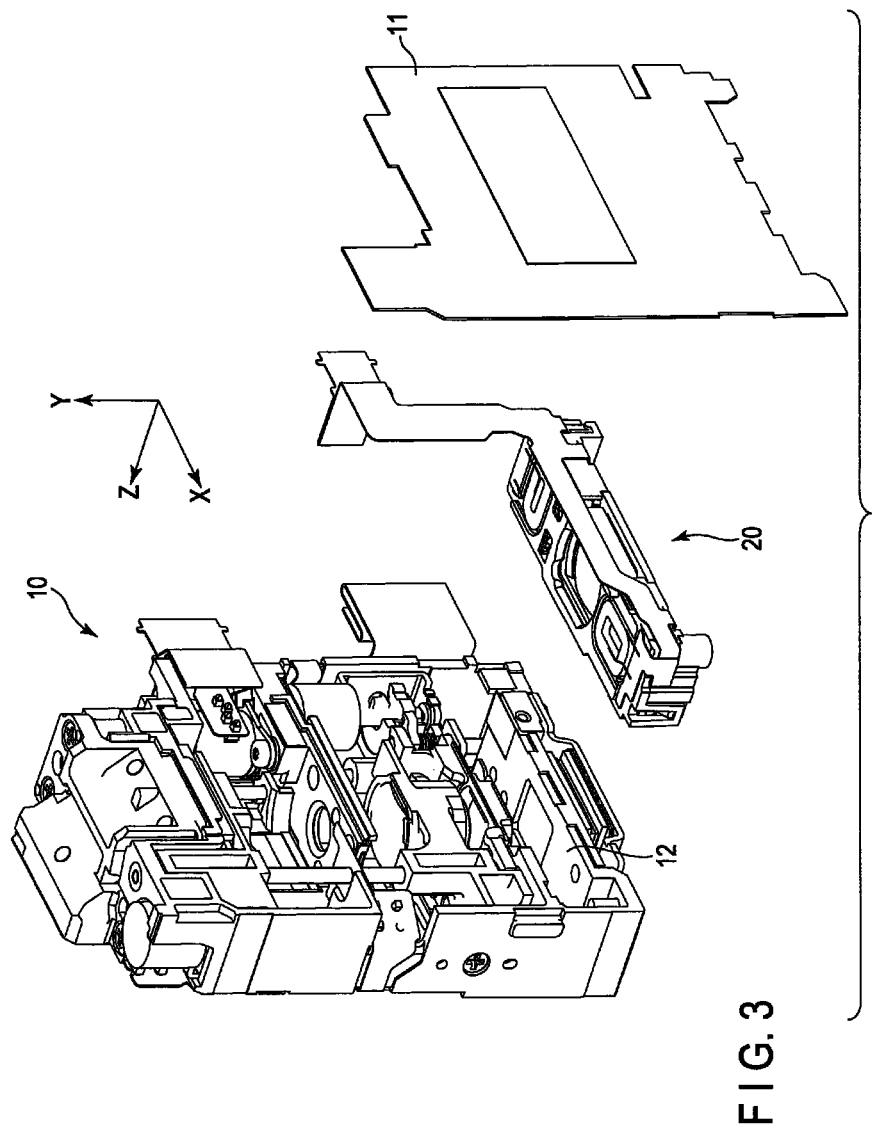
FIG. 3 is an exploded perspective view of a lens frame shown in FIG. 2.
Figure 4:
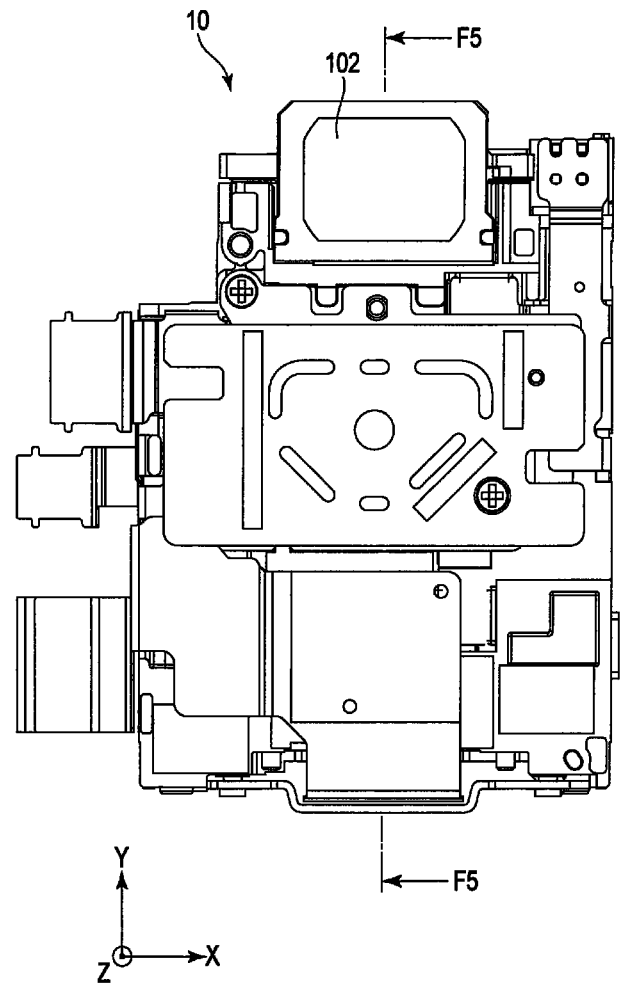
FIG. 4 is a front view in which the lens frame shown in FIG. 2 is viewed from an object side.
Figure 5:
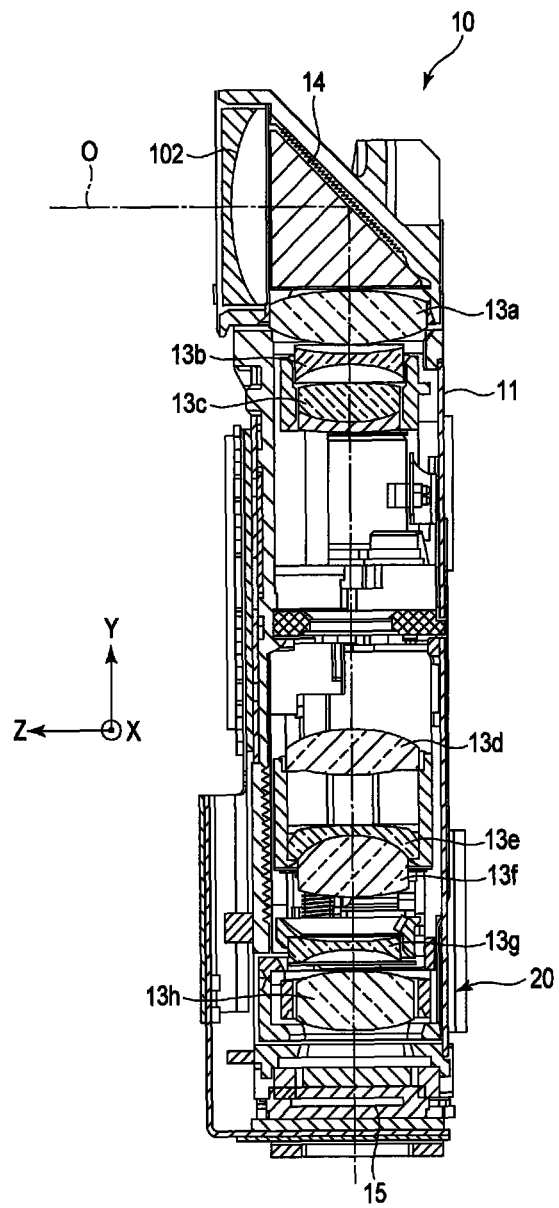
FIG. 5 is a sectional view in which the lens frame shown in FIG. 4 is cut along a line F5-F5.

FIG. 3 is an exploded perspective view of the lens frame 10. FIG. 4 is a front view showing the lens frame 10 from the front. FIG. 5 is a sectional view in which the lens frame 10 is cut along a line F5-F5 in FIG. 4.

As shown in FIG. 3, the lens frame 10 includes a back cover 11, and includes an anti-vibration unit accommodating portion 12 for accommodating an anti-vibration unit 20 (a lens driving apparatus) inside the back cover 11. Also, as shown in FIG. 5, the lens frame 10 includes a plurality of lenses 13a, 13b, 13c, 13d, 13e, 13f, 13g, and 13h along the optical axis O of light reflected downward by the reflecting mirror 14 (along the Y direction). The lens 13h positioned at the lowermost end along the optical axis O is an object to be moved in the anti-vibration unit 20.

Incident light from an object, which has entered the camera 100 through the lens 102, is bent downward at a right angle by the reflecting mirror 14, and captured by an image sensor 15 through the plurality of lenses 13a to 13h. In this state, the anti-vibration unit 20 moves the lens 13h along a plane perpendicular to the optical axis O, so as to correct an image blur which occurs when a vibration is given to the camera 100. In the camera 100 of this embodiment, the anti-vibration unit 20 moves the lens 13h along an XZ plane because the optical axis O is bent in the Y direction.

The anti-vibration unit 20 according to the first embodiment will be explained below with reference to FIGS. 6, 7, 8, 9, 10, 11, 12, 13, 14, and 15.

Figure 7:
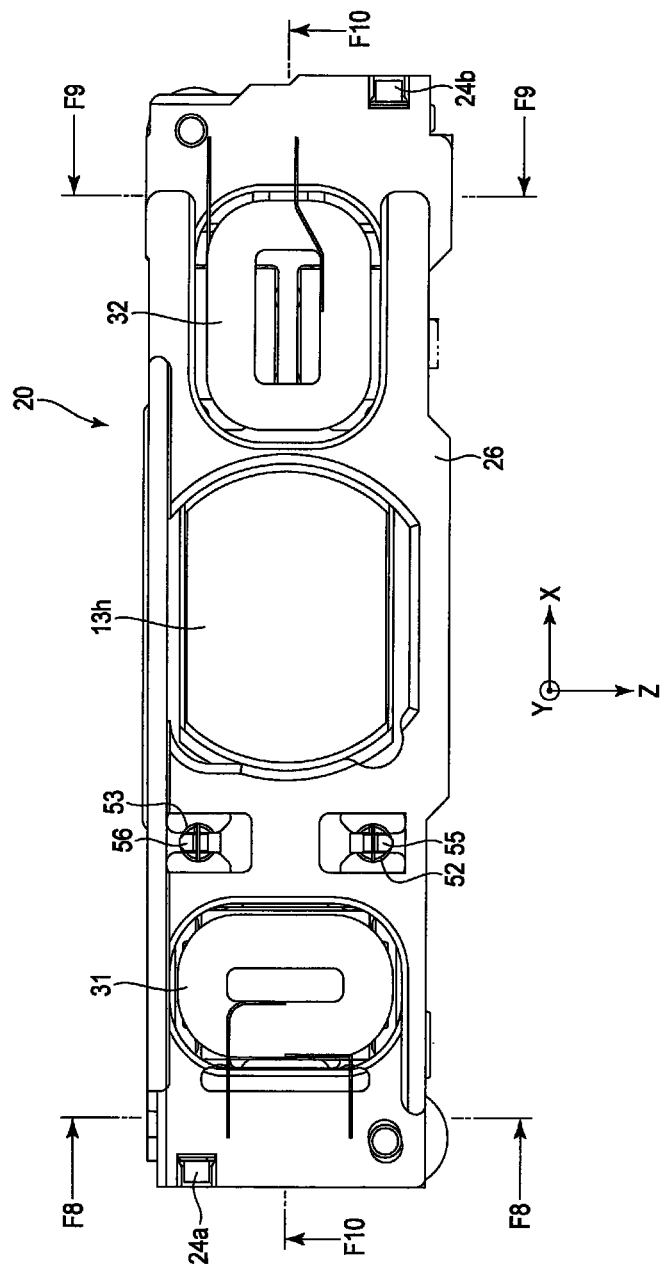
FIG. 7 is a plan view in which the anti-vibration unit shown in FIG. 6 is viewed from above.
Figure 8:
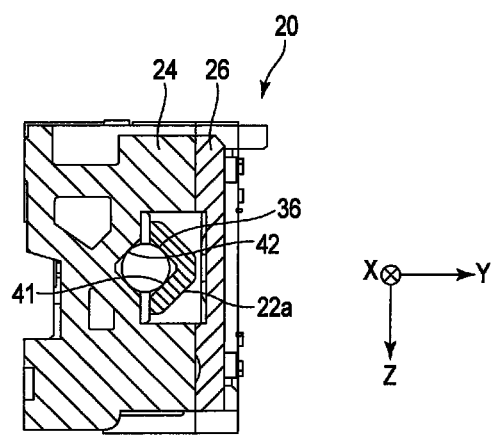
FIG. 8 is a sectional view in which the anti-vibration unit shown in FIG. 7 is cut along a line F8-F8.
Figure 9:
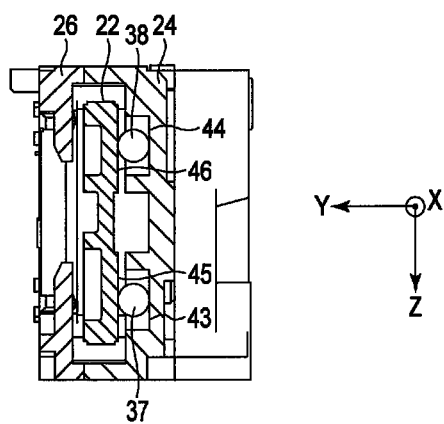
FIG. 9 is a sectional view in which the anti-vibration unit shown in FIG. 7 is cut along a line F9-F9.
Figure 10:
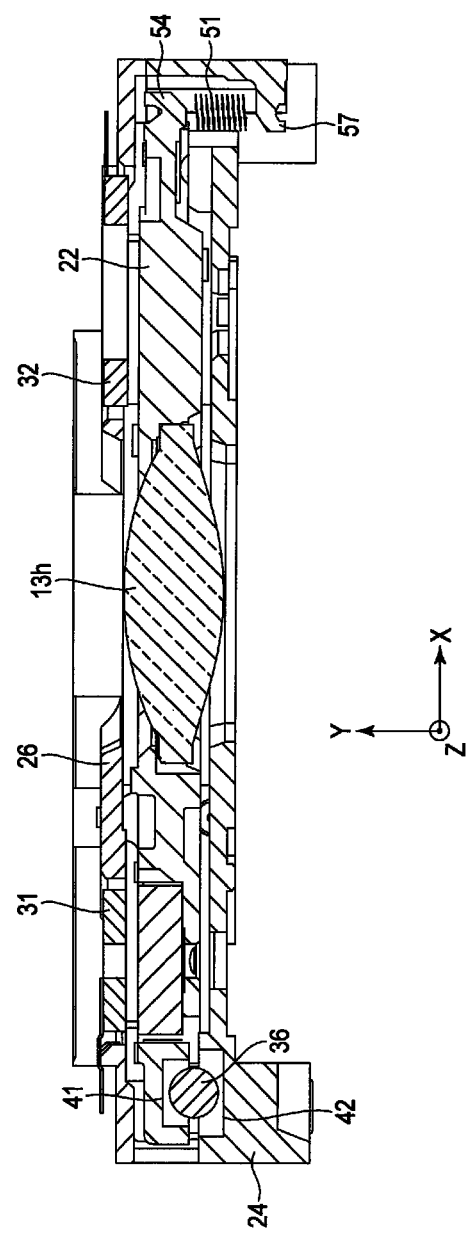
FIG. 10 is a sectional view in which the anti-vibration unit shown in FIG. 7 is cut along a line F10-F10.
Figure 11:
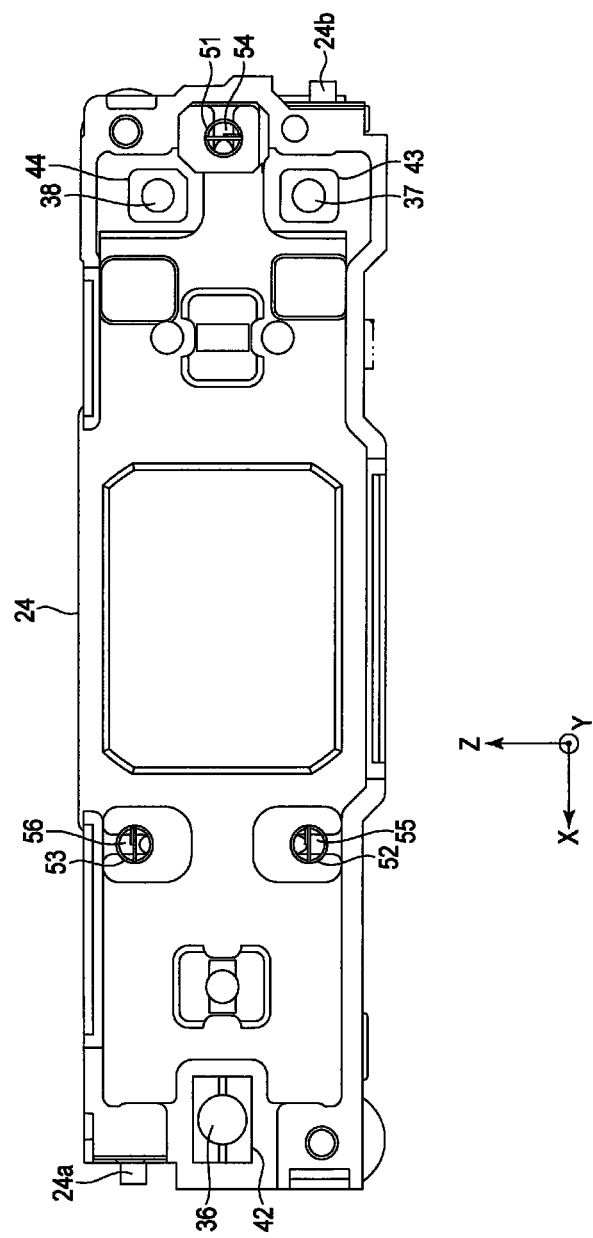
FIG. 11 is a plan view in which a fixed member shown in FIG. 6 is viewed from a movable member side.
Figure 13:
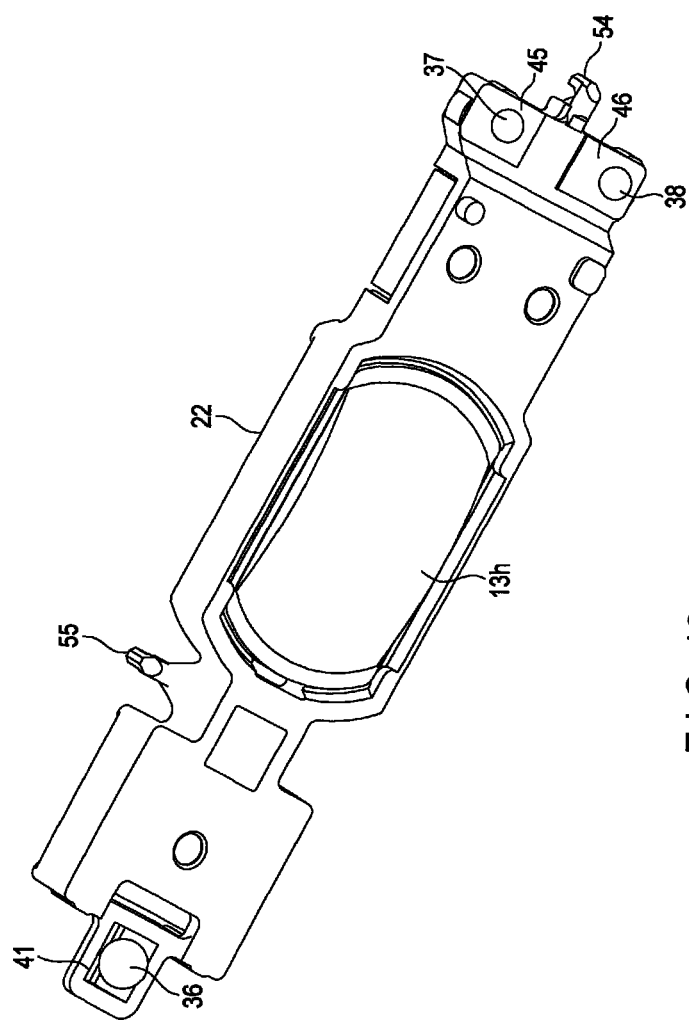
FIG. 13 is a perspective view in which a movable member shown in FIG. 6 is obliquely viewed from below.
Figure 14:
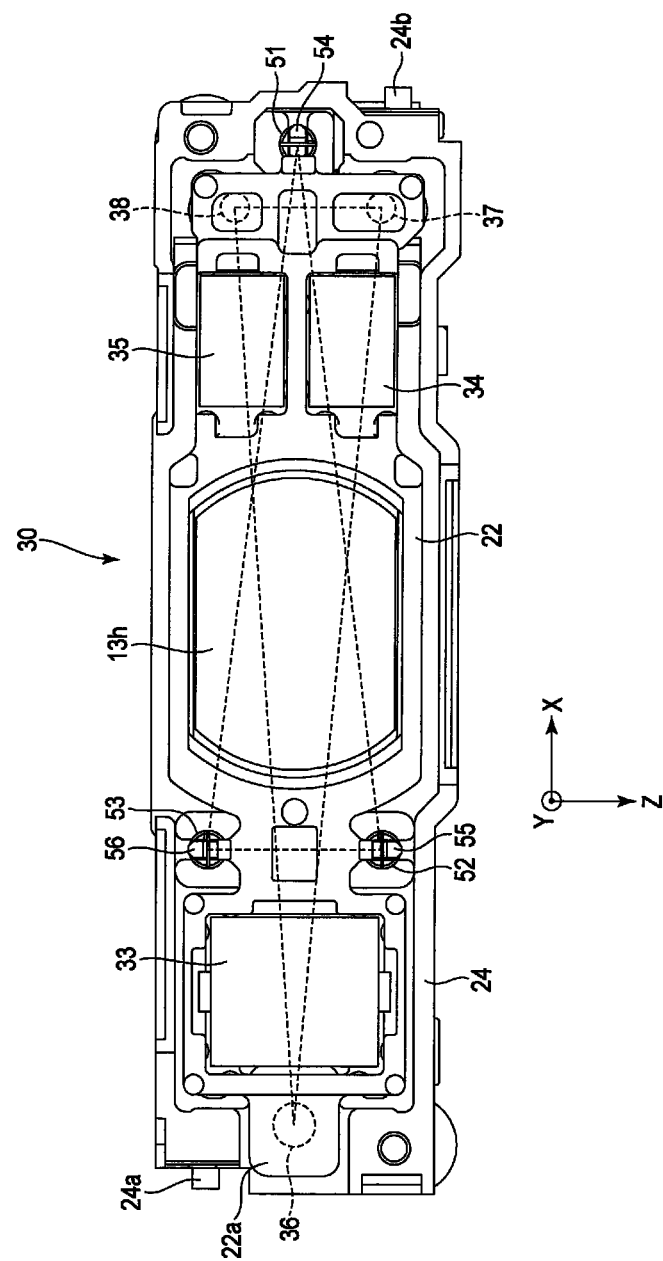
FIG. 14 is a plan view in which an assembly obtained by attaching the movable member shown in FIG. 13 to the fixed member shown in FIG. 11 is viewed from above.
Figure 15:
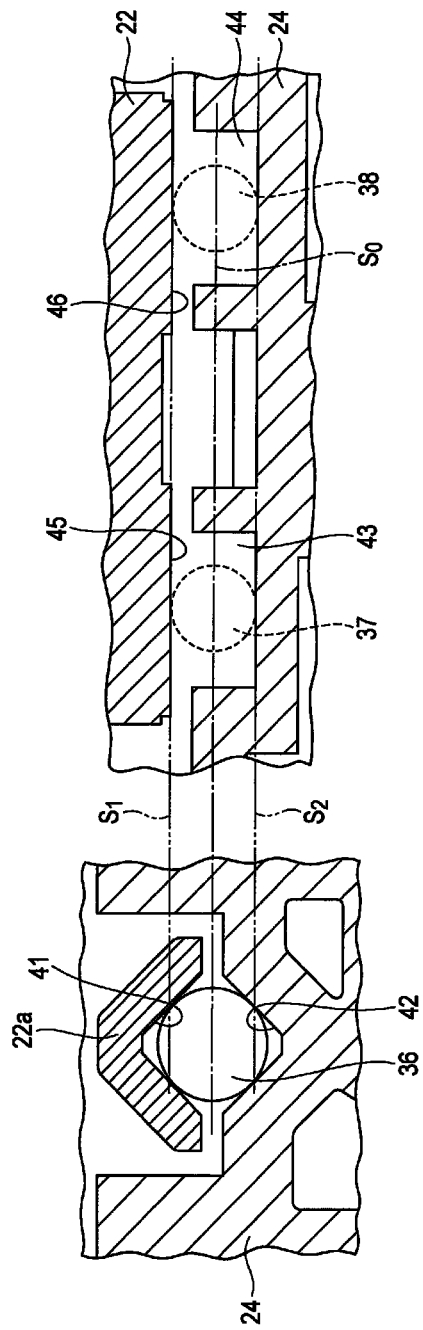
FIG. 15 is a sectional view for explaining the functions of three balls shown in FIG. 6.

FIG. 6 is an exploded perspective view of the anti-vibration unit 20. FIG. 7 is a plan view in which the anti-vibration unit 20 is viewed from above along the optical axis O. FIG. 8 is a sectional view in which the anti-vibration unit 20 is cut along a line F8-F8 in FIG. 7. FIG. 9 is a sectional view in which the anti-vibration unit 20 is cut along a line F9-F9 in FIG. 7. FIG. 10 is a sectional view in which the anti-vibration unit 20 is cut along a line F10-F10 in FIG. 7. FIG. 11 is a plan view in which a fixed member 24 is viewed from above along the optical axis O. FIG. 12 is a perspective view of the fixed member 24. FIG. 13 is a perspective view in which a movable member 22 is obliquely viewed from below. FIG. 14 is a plan view in which an assembly 30 obtained by attaching the movable member 22 shown in FIG. 13 to the fixed member 24 shown in FIG. 11 is viewed from above. FIG. 15 is a sectional view for explaining the functions of three balls 36, 37, and 38 which support the movable member 22 such that the movable member 22 can move with respect to the fixed member 24. Note that in FIGS. 7, 8, 9, and 10, a flexible printed circuit board 21 (to be simply referred to as an FPC 21 hereinafter) of the anti-vibration unit 20 is not shown.

As shown in FIG. 6, the anti-vibration unit 20 includes the movable member 22 holding the lens 13h, the fixed member 24 (a first fixed member) which is arranged below the movable member 22 and supports the movable member 22 so that the movable member 22 can move along the XZ plane, and a coil frame 26 (a second fixed member) arranged above the movable member 22. That is, the movable member 22 is arranged in a non-contact state in the space between the fixed member 24 and coil frame 26. The movable member 22, fixed member 24, and coil frame 26 are arranged such that their longitudinal directions are parallel to the X direction.

The lens 13h is held in almost the center of the movable member 22 in the longitudinal direction. The coil frame 26 holds two coils 31 and 32 spaced apart from each other on the two sides in the longitudinal direction so as to sandwich the lens 13h between them. Also, the movable member 22 includes three magnets 33, 34, and 35 which oppose the coils 31 and 32. In this embodiment, the coils 31 and 32 are formed in the coil frame 26, and the magnets 33 and 34 are formed in the movable member 22. However, it is also possible to form the coils 31 and 32 in the movable member 22, and the magnets 33 and 34 in the coil frame 26.

In this embodiment, the magnet 33 formed on a one-end side of the movable member 22 opposes the coil 31, and the two magnets 34 and 35 formed on an other-end side of the movable member 22 so as to sandwich the lens 13h between the magnet 33 and the magnets 34 and 35 oppose the coil 32. The two magnets 34 and 35 are divided in order to maintain the mechanical strength of the movable member 22, but they may also be integrated into one magnet like the magnet 33.

The coil frame 26 is fixed to the fixed member 24 so as not to contact the movable member 22. The movable member 22 is not in contact with the fixed member 24 as well. When fixing the coil frame 26 to the fixed member 24, claws 24a and 24b projecting from the two ends of the fixed member 24 in the longitudinal direction respectively engage with engaging holes 27a and 27b formed in tongue pieces 26a and 26b projecting downward from the two ends of the coil frame 26 in the longitudinal direction. The FPC 21 is attached to the coil frame 26 so as to be connected to the coils 31 and 32.

The coil 31 and magnet 33 on a one-end side of the lens 13h form a voice coil motor (VCM) for a straight motion, and function as a first driver (first actuator) for driving the movable member 22 (i.e., the lens 13h) in the X direction. Also, the coil 32 and magnets 34 and 35 on an other-end side form a voice coil motor (VCM) for a pivotal motion, and function as a second driver (second actuator) for driving the lens 13h in nearly the Z direction by swinging the movable member 22. The first and second drivers function as a driving means for moving the lens 13h in a desired direction along the XZ plane in cooperation with each other.

Electric currents controlled by a controller (not shown) are supplied to the coils 31 and 32 via the FPC 21. By controlling the direction of an electric current to be supplied to the coil 31, it is possible to change the direction of a magnetic flux to be applied to the magnet 33, and bidirectionally move the movable member 22 in the longitudinal direction (X direction). Also, by controlling the direction of an electric current to be supplied to the coil 32, it is possible to change the direction of a magnetic flux to be applied to the magnets 34 and 35, and swing the movable member 22 to the two sides in the short-length direction (Z direction). In other words, the postures of the two coils 31 and 32 and three magnets 33, 34, and 35 are decided so as to enable the operation of the movable member 22 along the XZ plane as described above.

The three balls 36, 37, and 38 are arranged between the movable member 22 and fixed member 24. The ball 36 (a first ball) which is only one ball having a large diameter among the three balls functions as a central sphere which gives a pivotal center to the movable member 22. As shown in FIG. 8, the ball 36 is arranged on a one-end side of the movable member 22 (the fixed member 24) so as to be sandwiched between a groove 41 (a second long groove) of the movable member 22 and a groove 42 (a first long groove) of the fixed member 24.

The two grooves 41 and 42 are grooves extending in the same direction so as to oppose each other, and having V-shaped sections.

The groove 41 of the movable member 22 is formed on the lower-surface side of a projection 22a projecting from one end of the movable member 22 in a direction away from the lens 13h. That is, the groove 41 is formed in the end portion of the movable member 22, which is farthest from the lens 13h. As shown in FIG. 13, the groove 41 is extended along the longitudinal direction (X direction) of the movable member 22.

On the other hand, as shown in FIG. 12, the groove 42 of the fixed member 24 is also extended along the longitudinal direction (X direction) of the fixed member 24. Note that the two grooves 41 and 42 are each closed at the two ends in the longitudinal direction, thereby preventing the removal of the ball 36.

The two remaining balls 37 and 38 function as swinging spheres (second balls) for swinging the movable member 22 around the above-described, large-diameter ball 36 along the XZ plane. The two balls 37 and 38 are spaced apart from each other along the circumference around the ball 36, on the side opposite to the side of the ball 36 with the lens 13h being sandwiched between them.

The two balls 37 and 38 are respectively accommodated in rectangular recesses 43 and 44 formed in the upper surface of the fixed member 24. The balls 37 and 38 arranged in the recesses 43 and 44 are pressed by flat pads 45 and 46 formed on the lower surface of the movable member 22. Since the recesses 43 and 44 of the fixed member 24 have a predetermined depth, the removal of the balls 37 and 38 can be prevented by pressing them by the flat pads 45 and 46.

Note that the large-diameter ball 36 is in contact at two points with the two walls opposing each other at a right angle of the groove 41 of the movable member 22, and in contact at two points with the two walls of the groove 42 of the fixed member 24. That is, the ball 36 is in contact with the grooves 41 and 42 at four points. Also, the two remaining balls 37 and 38 are respectively in point-contact with the bottom surfaces of the recesses 43 and 44 of the fixed member 24, and are respectively in point-contact with the pads 45 and 46 of the movable member 22. That is, the two balls 37 and 38 are respectively in contact with the recesses 43 and 44 and pads 45 and 46 at two points.

Three tension springs 51, 52, and 53 are extended between the movable member 22 and fixed member 24. The three tension springs 51, 52, and 53 function as a biasing means for biasing the movable member 22 and fixed member 24 in a direction in which they approach each other.

The tension spring 51 is arranged on the side opposite to the side of the large-diameter ball 36 with the lens 13h being sandwiched between them. The two remaining tension springs 52 and 53 are arranged on the side opposite to the side of the tension spring 51 with the lens 13h being sandwiched between them. The three tension springs 51, 52, and 53 are arranged in positions forming a first triangle. The three balls 36, 37, and 38 described above are arranged in positions forming a second triangle which points in a direction opposite to that of the first triangle.

In a general image stabilization apparatus, tension springs are arranged near spherical spacers arranged between a movable member and fixed member. In this embodiment, however, the tension spring 51 is arranged on the side in which the two balls 37 and 38 are arranged, and the two tension springs 52 and 53 are arranged on the side in which the ball 36 is arranged, with the lens 13h being sandwiched between the two sides.

One end of each of the tension springs 51, 52, and 53 is slightly extended and hooked on one of hooks 54, 55, and 56 projecting from the movable member 22. The other end of each of the tension springs 51, 52, and 53 is slightly extended and hooked on one of hooks 57, 58, and 59 formed on the fixed member 24.

Consequently, the movable member 22 is pulled toward the fixed member 24 so as to press the three balls 36, 37, and 38 sandwiched between them. In this state, the large-diameter ball 36 is movable in the X direction along the two grooves 41 and 42, and the movable member 22 is swingable around the ball 36. In other words, the two grooves 41 and 42 prohibit the movement of the movable member 22 to the Z-direction component in the position of the ball 36, and permit pivoting around the ball 36 and sliding in the X direction.

FIG. 14 is a plan view showing the assembly 30 combining the movable member 22 and fixed member 24, in which broken lines indicate a triangle connecting the centers of the three balls 36, 37, and 38, and another triangle connecting the centers of the three tension springs 51, 52, and 53. As shown in FIG. 14, these two triangles overlap each other in opposite directions. Note that the barycenter of one triangle exists in the other triangle, and the barycenter of the other triangle exists in one triangle.

As shown in FIG. 14, the tension spring 51 is arranged on the opposite side spaced apart from the pivoting center of the movable member 22, i.e., on the side opposite to the side of the large-diameter ball 36 with the lens 13h being sandwiched between them. This makes it possible to relatively decrease (weaken) the restoring force of the tension spring 51 when the movable member 22 pivots around the ball 36. By contrast, if the two tension springs 52 and 53 are arranged on the side opposite to the side of the ball 36 with the lens 13h being sandwiched between them, the restoring force of the tension springs 52 and 53 increases when the movable member 22 pivots around the ball 36.

That is, by arranging the tension spring 51 in a position far from the ball 36 (the pivoting center), it is possible to decrease the moment based on the restoring force of the tension spring 51, and suppress the resonance frequency of the anti-vibration unit 20. In this embodiment, therefore, it is possible to accurately control the operation of the anti-vibration unit 20, and improve the anti-vibration performance.

Note that this embodiment shown in FIG. 14 adopts the layout in which the ball 36 is arranged outside the magnet 33, the two tension springs 52 and 53 are arranged between the magnet 33 and lens 13h, and the two balls 37 and 38 and the tension spring 51 are arranged outside the two magnets 34 and 35. However, the present invention is not limited to this, and it is possible to freely change the X-direction layout of the magnets 33, 34, and 35, balls 36, 37, and 38, and tension springs 51, 52, and 53. That is, the tension spring 51 need only be arranged on the side opposite to the side of the ball 36 for a straight motion with the lens 13h being sandwiched between them.

Left side diagram of FIG. 15 is a partially enlarged view of the main components shown FIG. 8. Right side diagram of FIG. 15 is a partially enlarged view of the main components shown in FIG. 9. The left and Right side diagram of FIG. 15 are illustrated side by side by matching the positions in the Y direction, in order to facilitate understanding the Y-direction positional relationship between the three balls 36, 37, and 38.

As shown in FIG. 15, the centers of the three balls 36, 37, and 38 are arranged on a central plane S0 (a first plane) parallel to the XZ plane, the two points at which the large-diameter ball 36 is in contact with the groove 41 of the movable member 22 and the points at which the two balls 37 and 38 are in contact with the pads 45 and 46 of the movable member 22 are arranged on a plane S1 (a second plane) parallel to the XZ plane, and the two points at which the large-diameter ball 36 is in contact with the groove 42 of the fixed member 24 and the points at which the two balls 37 and 38 are in contact with the bottom surfaces of the recesses 43 and 44 of the fixed member 22 are arranged on a plane S2 (a third plane) parallel to the XZ plane.

In other words, in this embodiment, the diameter of the ball 36 is so designed that the centers of the three balls 36, 37, and 38 are arranged on the same plane S0, the four points at which the three balls 36, 37, and 38 are in contact with the movable member 22 are arranged on the plane S1 parallel to the plane S0, and the four points at which the three balls 36, 37, and 38 are in contact with the fixed member 24 are arranged on the plane S2 parallel to the plane S0. In this embodiment, the two grooves 41 and 42 holding the ball 36 each have two walls intersecting each other at a right angle. Therefore, the diameter of the ball 36 is designed to be √2 times the diameter of the two balls 37 and 38.

Accordingly, when the movable member 22 moves along the XZ plane in accordance with driving control of the anti-vibration unit 20, friction forces act on the circumferential surfaces of the balls 36, 37, and 38 in the two parallel planes S1 and S2. Since this stabilizes the balance of the moments of the friction forces acting on the circumferential surfaces of the balls 36, 37, and 38, the occurrence of resonance can be suppressed.

As described above, the first embodiment adopts the arrangement in which the two grooves 41 and 42 extending in the X direction hold the ball 36 as the pivoting center of the movable member 22. This makes it possible to accurately control the straight motion in the X direction and the pivoting motion around the ball 36 of the movable member 22 without any play between the circumferential surface of the ball 36 and the wall surfaces of the grooves 41 and 42. Especially in this embodiment, the circumferential surface of the large-diameter ball 36 is in contact with each of the grooves 41 and 42 at two points. Therefore, it is possible to disperse the load acting between the ball 36 and groove 41 (42), and decrease the friction force. This can make the above-described straight motion and pivoting motion smoother.

Also, in this embodiment, the tension spring 51 is arranged in a position farthest from the ball 36 as the pivoting center of the movable member 22. This makes it possible to weaken the restoring force when the movable member 22 swings from the home position, and decrease the resonance frequency of the anti-vibration unit 20 in a θ direction.

Next, an anti-vibration unit 60 according to the second embodiment will be explained with reference to FIGS. 16 and 17.

Figure 16:
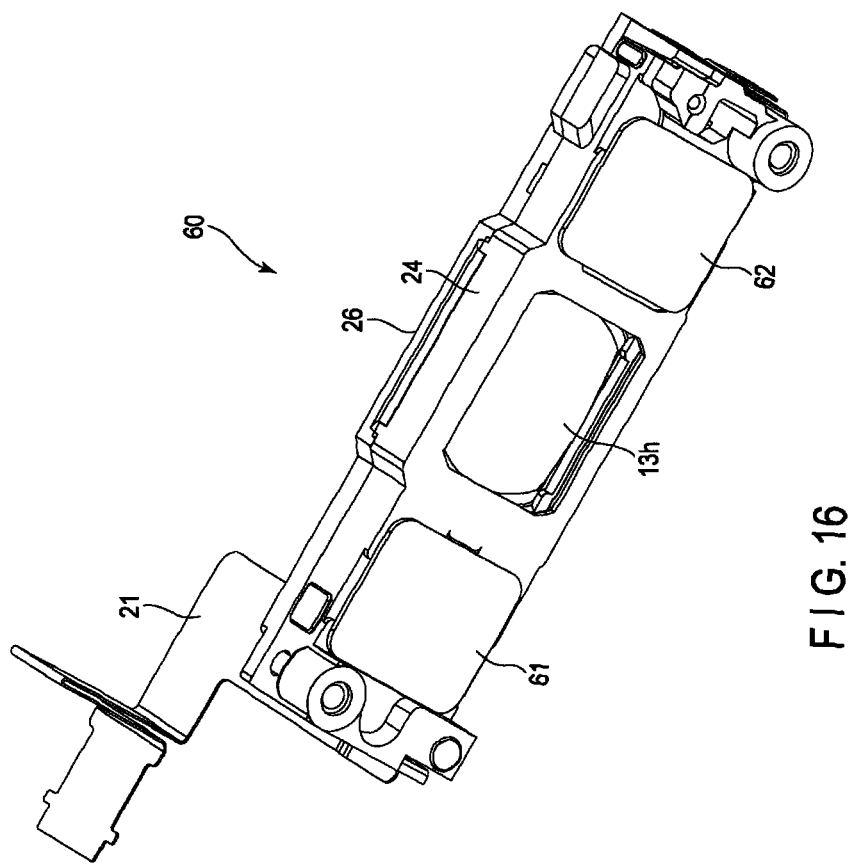
FIG. 16 is a perspective appearance view of an anti-vibration unit according to the second embodiment.

FIG. 16 is a perspective appearance view in which the anti-vibration unit 60 is viewed from below. FIG. 17 is an exploded perspective view of the anti-vibration unit 60. The anti-vibration unit 60 has almost the same structure as that of the anti-vibration unit 20 of the first embodiment described above, except that the anti-vibration unit 60 includes two plates 61 and 62 formed by a magnetic material such as iron, instead of the three tension springs 51, 52, and 53. In this embodiment, therefore, the same reference numerals as in the first embodiment denote constituent elements functioning in the same ways as in the first embodiment, and a detailed explanation thereof will be omitted.

The two plates 61 and 62 are arranged to oppose magnets 33, 34, and 35 on the lower-surface side of a fixed member 24. The plate 61 is fixed to the fixed member 24 on the side opposite to the side of the magnet 33, and the plate 62 is fixed to the fixed member 24 on the side opposite to the side of the magnets 34 and 35. The plates 61 and 62 made of the magnetic material function as biasing means for attracting a movable member 22 to the fixed member 24 by magnetic attracting forces generated between the plates 61 and 62 and the opposing magnets 33, 34, and 35.

In this embodiment, two grooves 41 and 42 hold a large-diameter ball 36, and this enables a straight motion and pivoting motion without any backlash between the movable member 22 and fixed member 24, as in the above-described first embodiment.

Also, this embodiment does not use the tension springs 51, 52, and 53 unlike the first embodiment. This obviates the need to consider the restoring force of a spring, which is generated along the XZ plane, and makes it possible to increase the degree of freedom of the layout.

The present invention has been explained above based on the embodiments, but the present invention is not limited to the above-described embodiments, and various modifications and applications are of course possible within the spirit and scope of the invention.

For example, in the above-described embodiments, the case in which the grooves 41 and 42 holding the large-diameter ball 36 have the V-shaped sections has been explained. However, the present invention is not limited to this, and each groove can have any sectional shape as long as the groove has a shape in contact with the circumferential surface of the ball 36 at two points, and extends in the X direction. For example, a groove having a U-shaped section can be used.

Furthermore, in the above-described embodiments, the structure in which the movable member 22 holding the lens 13h is moved along the XZ plane with respect to the fixed member 24 has been explained. However, the present invention is not limited to this, and the movable member holding the image sensor 15 may also be moved with respect to the fixed member 24.

Other inventions will be described below.

[1] There is provided a driving apparatus including
a movable member holding an object to be moved,
a fixed member formed to oppose the movable member,
a central sphere arranged between the movable member and fixed member,
a rolling member arranged between the movable member and fixed member on the side opposite to the side of the central sphere with the object to be moved being sandwiched between them,
a biasing means for biasing the movable member and fixed member in a direction in which they approach each other, so as to press the central sphere and rolling member,
first and second grooves respectively formed in the movable member and fixed member, and accommodating the central sphere such that the central sphere can move close to and away from the object to be moved, and
a driving means for moving the movable member with respect to the fixed member.

[2] There is provided the apparatus according to [1], wherein the first and second grooves are grooves extending in the same direction so as to oppose each other, and having V-shaped sections.

[3] There is provided the apparatus according to [2], wherein the first groove is formed in one end of the movable member, which is spaced apart from the object to be moved.

[4] There is provided the apparatus according to [2], wherein the driving means includes a first driver for moving the movable member along the first and second grooves, and a second driver for pivoting the movable member around the central sphere arranged in the first and second grooves.

[5] There is provided the apparatus according to [2], wherein
the rolling member includes a plurality of swinging spheres arranged apart from each other along a circumference around the central sphere, and a first plane passing through the center of the central sphere and the center of each swinging sphere, a second plane passing through two points at which the central sphere is in contact with the first groove of the movable member and a point at which each swinging sphere is in contact with the movable member, and a third plane passing through two points at which the central sphere is in contact with the second groove of the fixed member and a point at which each swinging sphere is in contact with the fixed member are parallel to each other.

[6] There is provided the apparatus according to [1], wherein the biasing means includes a tension spring which biases the movable member and fixed member in a direction in which they approach each other, on the side opposite to the side of the central sphere with the object to be moved being sandwiched between them.

[7] There is provided a driving apparatus including
a movable member holding an optical element or image sensor,
a fixed member formed near the movable member in the optical-axis direction of the optical element or image sensor,
a central sphere which is arranged between the movable member and fixed member at a position spaced apart from the optical element or image sensor, and gives a pivoting center,
a plurality of swinging spheres arranged between the movable member and fixed member on the side opposite to the side of the central sphere with the optical element or image sensor being sandwiched between them,
a biasing means for biasing the movable member and fixed member in a direction in which they approach each other so as to press the central sphere and swinging spheres,
first and second grooves respectively formed in the movable member and fixed member so as to oppose each other, and accommodating the central sphere such that the central sphere can move close to and away from the optical element or image sensor,
a straight driving unit for moving the movable member in a first direction along the first and second grooves, and
a pivotal driving unit for pivoting the movable member around the central sphere arranged in the first and second grooves.

[8] There is provided the apparatus according to [7], wherein the first and second grooves are grooves extending in the first direction so as to oppose each other, and having V-shaped sections.

[9] There is provided the apparatus according to [8], wherein the first groove is formed in one end of the movable member, which is spaced apart from the optical element or image sensor.

[10] There is provided the apparatus according to [8], wherein a first plane passing through the center of the central sphere and the center of each swinging sphere, a second plane passing through two points at which the central sphere is in contact with the first groove of the movable member and a point at which each swinging sphere is in contact with the movable member, and a third plane passing through two points at which the central sphere is in contact with the second groove of the fixed member and a point at which each swinging sphere is in contact with the fixed member are parallel to each other.

[11] There is provided the apparatus according to [7], wherein the biasing means includes a tension spring which biases the movable member and fixed member in a direction in which they approach each other, on the side opposite to the side of the central sphere with the optical element or image sensor being sandwiched between them.

[12] There is provided an image capturing apparatus including
an image sensor,
an optical element which forms an image of an object on the image sensor,
a movable member holding the optical element or image sensor,
a fixed member formed near the movable member in the optical-axis direction of the optical element or image sensor,
a central sphere which is arranged between the movable member and fixed member at a position spaced apart from the optical element or image sensor, and gives a pivoting center,
a plurality of swinging spheres arranged between the movable member and fixed member on the side opposite to the side of the central sphere with the optical element or image sensor being sandwiched between them,
a biasing means for biasing the movable member and fixed member in a direction in which they approach each other so as to press the central sphere and swinging spheres,
first and second grooves respectively formed in the movable member and fixed member so as to oppose each other, and accommodating the central sphere such that the central sphere can move close to and away from the optical element or image sensor,
a straight driving unit for moving the movable member in a first direction along the first and second grooves, and
a pivotal driving unit for pivoting the movable member around the central sphere arranged in the first and second grooves.

[13] There is provided the apparatus according to [12], wherein the first and second grooves are grooves extending in the first direction so as to oppose each other, and having V-shaped sections.

[14] There is provided the apparatus according to [13], wherein the first groove is formed in one end of the movable member, which is spaced apart from the optical element or image sensor.

[15] There is provided the apparatus according to [13], wherein a first plane passing through the center of the central sphere and the center of each swinging sphere, a second plane passing through two points at which the central sphere is in contact with the first groove of the movable member and a point at which each swinging sphere is in contact with the movable member, and a third plane passing through two points at which the central sphere is in contact with the second groove of the fixed member and a point at which each swinging sphere is in contact with the fixed member are parallel to each other.

[16] There is provided the apparatus according to [12], wherein the biasing means includes a tension spring which biases the movable member and fixed member in a direction in which they approach each other, on the side opposite to the side of the central sphere with the optical element or image sensor being sandwiched between them.

The invention claimed is:
1. A lens driving apparatus comprising:
a fixed member in which a first long groove is formed;
a movable member including a second long groove formed in a position corresponding to a position where the first long groove is formed, and configured to move with respect to the fixed member in a plane perpendicular to an optical axis of a lens held by the movable member;
a first ball arranged between the first long groove formed in the fixed member and the second long groove formed in the movable member, and configured to guide the movable member with respect to the fixed member along the first long groove and the second long groove;

a plurality of second balls arranged on a side opposite to a side of the first ball with the lens formed in the movable member being sandwiched between the two sides, and configured to support movement of the movable member together with the first ball;

a first actuator including a coil arranged in one of the fixed member and the movable member, and a magnet arranged in the other, and configured to generate a driving force for moving the movable member along the first long groove and the second long groove; and a second actuator including a coil arranged in one of the fixed member and the movable member, and a magnet arranged in the other, and configured to generate a driving force for pivoting the movable member with respect to the fixed member, wherein a pivoting center around which the movable member is pivoted with respect to the fixed member by the second actuator is a position of the first ball when the movable member is moved along the first long groove and the second long groove by the first actuator.

2. The apparatus according to claim 1, wherein the second long groove formed in the movable member is formed on a one-end side of the movable member, and the second balls are arranged on an other-end side opposite to the one-end side with the lens being sandwiched therebetween.

3. The apparatus according to claim 2, wherein the first actuator is arranged on the one-end side of the movable member, and the second actuator is arranged on the other-end side opposite to the one-end side, with the lens being sandwiched therebetween.

4. The apparatus according to claim 1, wherein a sectional shape of each of the first long groove formed in the fixed member and the second long groove formed in the movable member is one of a V-shape and a U-shape.

5. The apparatus according to claim 1, wherein the fixed member includes a first fixed member including the first ball and the second balls between the first fixed member and the movable member, and a second fixed member including one of the coil and the magnet of the first actuator and one of the coil and the magnet of the second actuator, and has a boxy shape having a space for holding the movable member between the first fixed member and the second fixed member in a non-contact state.

6. The apparatus according to claim 1, wherein diameters of the plurality of second balls are equal, a diameter of the first ball is set to be larger than that of the second balls, and central positions of the first ball and the second balls are arranged in the same plane perpendicular to the optical axis of the lens.

7. The apparatus according to claim 1, further comprising three biasing means for biasing the movable member and the fixed member in a direction in which the movable member and the fixed member approach each other with the first ball and the second balls being sandwiched therebetween, wherein the three biasing means are arranged in positions which form a first triangle such that the lens is positioned inside the first triangle, the first ball and the second balls are arranged in positions which form a second triangle such that the lens is positioned inside the second triangle, and the first triangle and the second triangle are arranged to point in opposite directions.

* * * * *